United States Patent [19]
Wossner

[11] 3,709,517
[45] Jan. 9, 1973

[54] APPARATUS FOR LEVELLING A VEHICLE CHASSIS

[75] Inventor: Felix Wossner, 872 Schweinfurt am Main, Germany

[73] Assignee: Fichrel & Sachs AG, Schweinfurt am Main, Germany

[22] Filed: May 17, 1971

[21] Appl. No.: 143,929

[30] Foreign Application Priority Data

May 21, 1970 Germany.....................P 20 24 750.1

[52] U.S. Cl. ..............................280/104, 280/124 F
[51] Int. Cl..............................................B60g 21/04
[58] Field of Search ..........................280/124 F, 104

[56] References Cited

UNITED STATES PATENTS

| | | | |
|---|---|---|---|
| 3,154,317 | 10/1964 | Gustafsson | 280/104 |
| 3,539,197 | 11/1970 | Remaud | 280/104 |

*Primary Examiner*—Philip Goodman
*Attorney*—Kelman & Berman

[57] ABSTRACT

A sensing element in a chassis levelling arrangement for an automotive vehicle is connected to an axle of the vehicle and to the vehicle chassis directly or indirectly by respective tension springs which bias the sensing element in opposite directions. As the axle moves relative to the chassis, the sensing element makes a corresponding movement greatly reduced in magnitude. Movement of the sensing element is transmitted to a control mechanism for adjusting the spacing between the axle and the chassis in a direction to counteract the initial axle movement.

12 Claims, 9 Drawing Figures

PATENTED JAN 9 1973 3,709,517
SHEET 1 OF 4
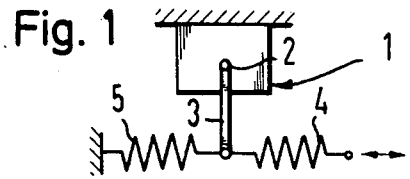
Fig. 1
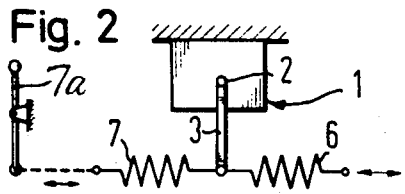
Fig. 2
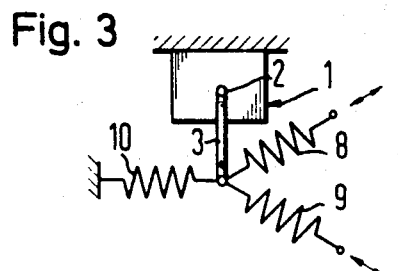
Fig. 3
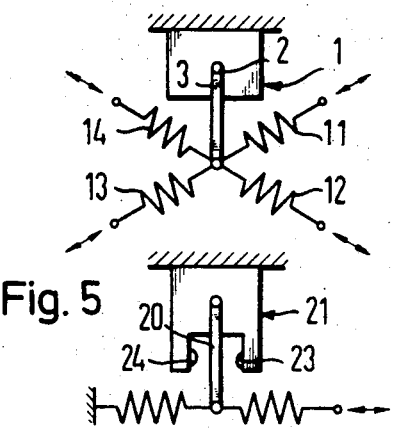
Fig. 4
Fig. 5
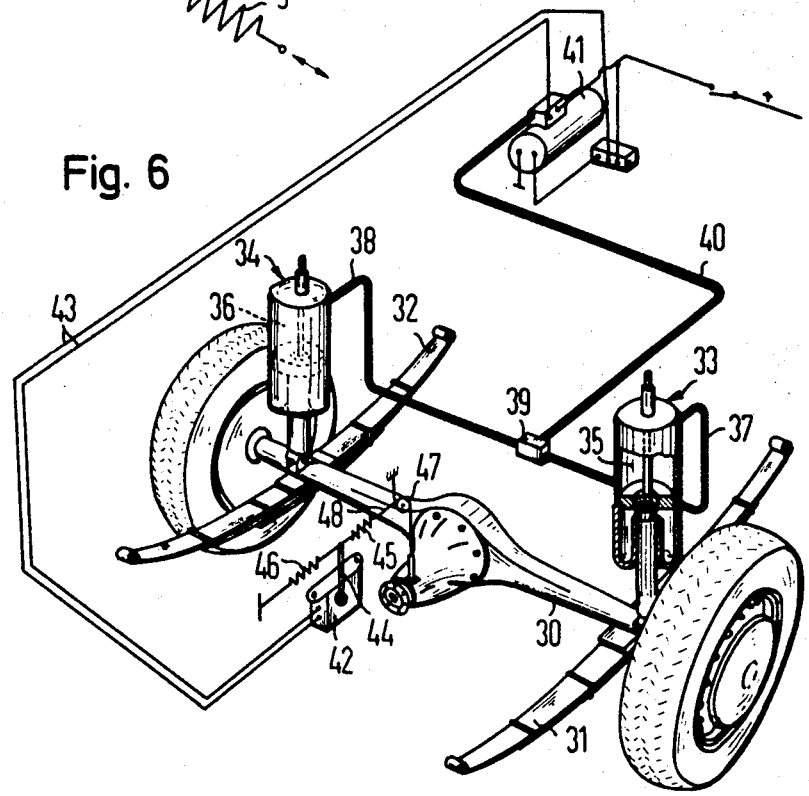
Fig. 6
INVENTOR
Felix Wössner
BY: Kelman and Berman,
AGENTS INVENTOR
Felix Wössner BY: Kelman and Berman
Agents

APPARATUS FOR LEVELLING A VEHICLE CHASSIS

This invention relates to apparatus for levelling a vehicle, particularly an automotive vehicle.

It is known to equip such a vehicle with an operating device for varying the spacing of a wheel, or of the axle carrying the wheel, from the vehicle chassis, the latter term being employed herein broadly to embrace not only the frame of the vehicle, but also elements fixedly attached to the frame, and the unitary body-frame structure of a vehicle not equipped with a separate body and frame. If automatic levelling is desired, a sensing device is provided for sensing changes in the spacing of the axle from the frame, and a control mechanism is connected with the operating device and the sensing mechanism for controlling the operating mechanism in response to the sensed change in the spacing.

Such automatic levelling apparatus may be installed between each wheel or the associated axle and the chassis or between the chassis and several wheels. It is common practice in all arrangements of this type to connect the sensing mechanism with a controlled axle through a motion reducing device, that is, a sensing element is connected with the axle in such a manner that the movement of the sensing element has only a fraction of the magnitude of the corresponding axle movement relative to the chassis. In a passenger car, the fraction may typically be one fifth.

This reduction in the stroke of the sensing element, particularly when combined with some lost motion in the motion transmitting train, sharply reduces the sensitivity of the control apparatus to changes in the spacing of the axle from the chassis. The known devices also are rather complex and correspondingly costly, and they are limited in their adaptability to specific requirements.

It is an object of this invention to provide a vehicle levelling apparatus of the general type described with a sensing arrangement in which the necessary reduction in stroke or amplitude in the motion transmitted from the controlled wheel or axle to the sensing mechanism is achieved without loss of sensitivity.

Another object is the provision of a levelling apparatus for the chassis of a vehicle whose sensing device is relatively inexpensive to build, yet reliable and versatile.

With these and other objects in view, as will hereinafter become apparent, the invention provides the sensing device of the levelling apparatus with a sensing element which is movable and connected to the control device for actuating the same by the movement of the sensing element. A first yieldably resilient device connects the sensing element to the controlled axle and normally biases the sensing element to move in a first direction. A second yieldably resilient device is interposed directly or indirectly between the sensing element and the chassis in such a manner as normally to bias the sensing element to move in a second direction opposite to the afore-mentioned first direction.

Other features, additional objects, and many of the attending advantages of this invention will readily be appreciated as the same becomes better understood by reference to the following detailed description of preferred embodiments when considered in connection with the appended drawing in which:

FIG. 1 diagrammatically illustrates a first sensing arrangement of the invention;

FIGS. 2 to 5 illustrate modified sensing arrangements in views corresponding to that of FIG. 1;

FIG. 6 is a fragmentary perspective view of a motorcar equipped with a sensing arrangement of the invention of the type illustrated in FIG. 1;

Figure 7:
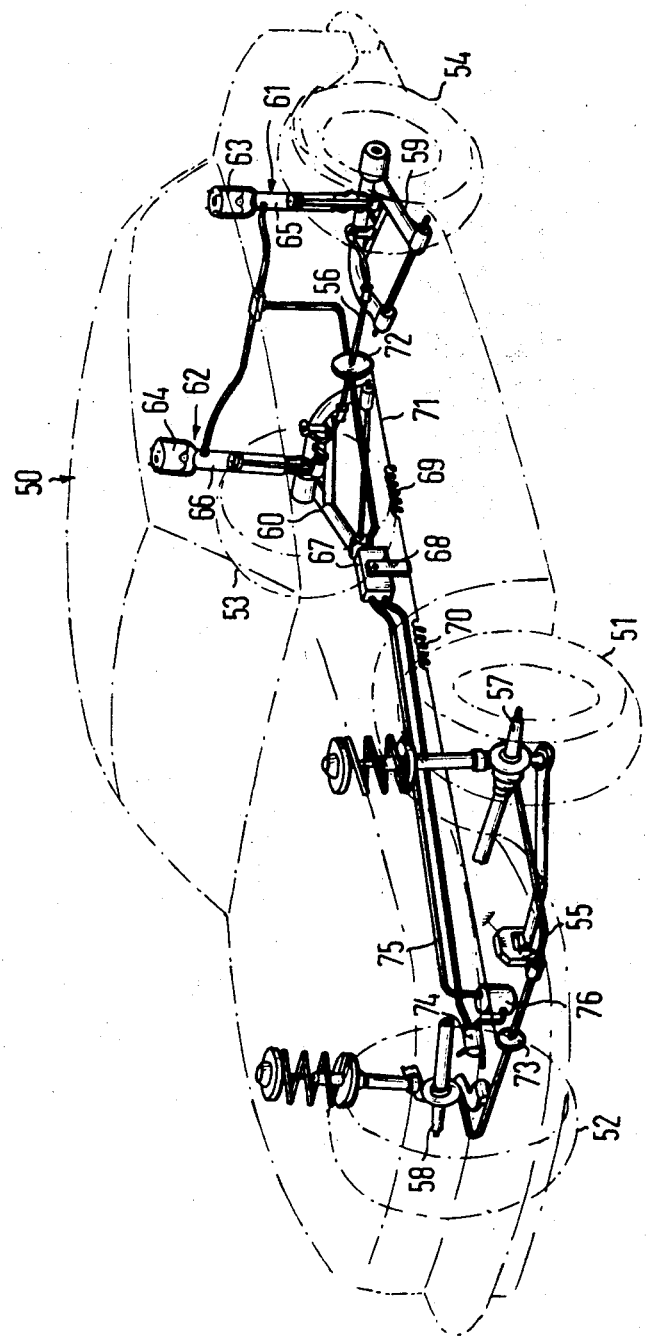
FIG. 7 shows another motorcar equipped with a sensing arrangement of the type illustrated in FIG. 2 in a fragmentary perspective view, portions of the motorcar being shown in phantom view.

Referring now to the drawing in detail, and initially to FIG. 1, there is seen a control box 1 enclosing a control device for an operating mechanism which shifts an axle relative to the associated chassis. The box 1 is mounted on the chassis, and only the input shaft 2 of the control mechanism projects from the box 1. It carries a radial sensing arm 3 whose one end is fixedly attached to the shaft 2.

The free end of the arm 3 is fastened to coaxial, helical tension springs 4, 5 which normally bias the arm to pivot in respective opposite directions. The end of the spring 4 remote from the arm 3 is attached to the controlled axle, not itself seen in FIG. 1, in such a manner as to pull the arm toward the right when the axle moves away from the shaft. This movement is opposed by the tension springs 5, whose remote end is attached to the chassis.

Assuming that the free end of the arm 3 moves in an arc short enough to be considered rectilinear, the stroke of the free end after an axle movement to a new condition of equilibrium is determined by the equation:

$$x_R = x_4 \cdot c_4 + x_5 \cdot c_5 / c_4 + c_5$$

wherein $x_R$ is the stroke or movement of the free arm end, $x_4$ is the length change of the spring 4, $x_5$ is the length change of the spring 5, and $c_4$, $c_5$ are the spring constants of the springs 4, 5 respectively. The actual movement of the arm 3 can thus be set to assume any desired magnitude for a given axle movement by choosing springs 4 and 5 for suitable characteristics. There is no lost motion in this mechanism which is under tensional stress in all normal operating conditions, and the arm movement is uniquely correlated with the axle movement.

The basic arrange of FIG. 1 is readily modified to make it responsive to more than one independent variable.

The arm 3 in the modified arrangement of FIG. 2 is acted upon by two opposed tension springs 6, 7. The spring 6 is connected to a controlled axle as described with reference to the spring 4 in FIG. 1. The spring 7 is connected to the chassis by means of an element 7a which is movable on the chassis. This element may be a manually adjustable tensioning lever which permits an operator to vary the normal biasing force with which the spring 7 counteracts the force of the spring 6. The movable element also may be an axle whose spacing from the chassis is not controlled and adjusted as will be described in more detail hereinafter with reference to FIG. 7. The sensing arrangement illustrated in FIG. 2 thus may respond to two independent variables in actuating a non-illustrated operating mechanism.

A further variant of the spring arrangement described with reference to FIG. 1 is seen in FIG. 3. Two springs 8, 9 connect two controlled elements, for example, the axles of two front wheels of a motorcar provided with adjustable suspensions, to the arm 3 in joint opposition to a spring 10 which connects the arm to the chassis. If the left front axle rises while the right front axle moves away from the chassis by a corresponding distance, the arm 3 stands still. If both axles move in a common direction, the arm 3 actuates the control mechanism in the box 1.

FIG. 4 diagrammatically illustrates a further modified spring arrangement combining features of FIGS. 2 and 3 in that two springs 11, 12 are connected to respective, automatically adjusted axles, and two springs 13, 14 to the chassis by way of respective movable elements. If the four springs are connected to the four wheels or axles of a motorcar, and if the shaft 2 can transmit an angular movement of the arm 3 in two planes perpendicular to each other to a suitable control device in the box 1 in a manner conventional in itself, a vehicle may be leveled in all planes by means of a sensing device of the invention.

If so desired, the actual movement of the sensing element may be limited as is shown in FIG. 5 in which a sensing arm 20 is mounted on a control box 21 for pivoting movement by two opposed tension springs as described hereinabove with reference to FIG. 1. Abutments 23, 24 on the box 21 arrest the arm 20 in selected terminal positions, and all further displacement of an axle relative to the vehicle chassis is absorbed by the springs, thereby avoiding possible damage to the control device even where the springs are chosen to move the arm 20 at almost the same rate as the controlled axle.

An actual application of the arrangement diagrammatically illustrated in FIG. 1 is shown in FIG. 6 which illustrates only as much of an otherwise conventional motorcar as is necessary for an understanding of this invention. The car is equipped with a rigid rear axle 30 suspended from the non-illustrated chassis by means of leaf springs 31, 32 and carrying the two rear wheels of the vehicle. The terminal portions of the axle 30 adjacent the wheels are additionally supported by pneumatic springs 33, 34 whose piston rods are attached to the axle while the cylinders are attached to the chassis, as is conventional and not explicitly shown.

The air chambers 35, 36 of the pneumatic springs are connected by conduits 37, 38 to a distributor 39 which in turn is connected by a pipe 40 to a compressor enclosed in a common shell 41 with a closely coupled electric motor.

The control box 42 of the levelling apparatus for the illustrated motorcar is mounted on the chassis and encloses a switch connected to the energizing circuit for the compressor motor by conductors 43. The switch is opened and closed by a sensing arm 44 pivotally mounted on the control box 42 in the manner described with reference to FIG. 1. The free end of the arm 44 is biased counterclockwise, as viewed in FIG. 6, by a helical tension spring 46 whose other end is attached to the chassis, and clockwise by a similar spring 45 at the end of a cable or other tension element 48 attached to the axle 30 and guided over a pulley 47 on the chassis.

If the load on the rear wheels of the vehicle is increased so that the rear portion of the chassis approaches the axle 30, the spring 45 is partly relaxed, and the arm 44 is pivoted counterclockwise by the prestressed spring 46, thereby closing the switch in the control box 42 and energizing the compressor. The increased pressure in the air chambers 35, 36 raises the chassis toward its initial level until the switch in the control box 42 is again opened. Clockwise displacement of the arm 44 is caused by removal of a load from the motorcar and closes a switch in the non-illustrated energizing circuit of a solenoid-operated venting valve (not shown) which releases air from the distributor 39 in a manner obvious from the illustrated compressor arrangement.

The front axles of the motorcar partly illustrated in FIG. 6 cannot be moved toward and away from the chassis in the manner shown for the rear wheels, and the illustrated sensing mechanism thus causes tilting movement of the chassis about an axis transverse to the direction of normal vehicle travel.

A sensing mechanism of the invention of the type illustrated in FIG. 2 is used in a motorcar partly shown in FIG. 7 for also tilting the chassis about a transverse axis.

The vehicle body 50, shown in phantom view, is fixedly attached or integral with the chassis supported on four independently sprung wheels 51, 52, 53, 54. The front wheels 51, 52 are connected by a stabilizer bar 55 directly connected to the steering knuckles 57, 58. A stabilizer bar 56 connects control arms 59, 60 for the shafts of the rear wheels 53, 54.

The rear wheels are mounted on respective hydropneumatic springs and shock absorbers 61, 62, conventional in themselves as is the entire suspension system described so far. Each hydropneumatic spring 61, 62 has an upper air or gas chamber 63, 64 separated by a diaphragm from a lower, oil-filled chamber 65, 66. The gas in the chambers 63, 64 provides the necessary spring action while the spacing between the rear wheel shafts and the chassis or body 50 may be varied by increasing or decreasing the amount of liquid in the chambers 65, 66.

A control box 67 on the chassis encloses a rotary valve which is set by a sensing arm 68. The free end of the arm 68 is oppositely biased by two tension springs 69, 70. The two ends of a steel rope 71 are respectively fastened to the end of the spring 69 remote from the arm 68 and to a tensioning pulley 72 fixedly mounted on the center portion of the rear stabilizer bar 56. The spring 70 is connected in an analogous manner to a tensioning pulley 73 on the center portion of the stabilizer bar 55 between the front wheels 51, 52.

If the load on the rear part of the body 50 is increased while the front end maintains its position, the pulley 72 turns in a direction to tension the rope 71, and to pivot the arm 68 counterclockwise, as seen in FIG. 7, whereby the valve in the control box 67 connects the discharge pipe of an oil pump 74 to the oil chambers 65, 66, the rear end of the chassis is lifted and the stabilizer bar 56 is turned in a direction to restore the neutral position of the arm 68 in which the oil discharged from the pump 74 is directed by a non-illustrated safety valve to a storage tank 76 and the intake pipe of the pump 74. The pump is driven by the non-illustrated engine of the motor car.

If the front end of the body 50 is lowered by a static or dynamic load, the pulley 73 is turned to pivot the sensing arm 68 clockwise from its neutral position, whereby the valve in the box 67 connects the chambers 65, 66 to a return line 75 leading to the tank 76 so that the rear end of the body 50 is lowered until the vehicle is again in its proper angular relationship to the underlying road surface.

If the two front wheels or the two rear wheels simultaneously move in opposite vertical directions, the center portions of the associated stabilizer bars 55, 56 do not turn, and the arm 68 remains in its neutral position. Similarly, nothing happens if the load on the front and rear ends of the body 50 is decreased or increased simultaneously because the resulting tension changes in the springs 69, 70 balance each other.

Suspension systems which can benefit from or require the sensing systems illustrated in FIGS. 3 to 5 will readily suggest themselves to those skilled in the art from the manner in which the systems of FIGS. 1 and 2 are applied in the vehicles partly illustrated in FIGS. 6 and 7.

Figure 8:
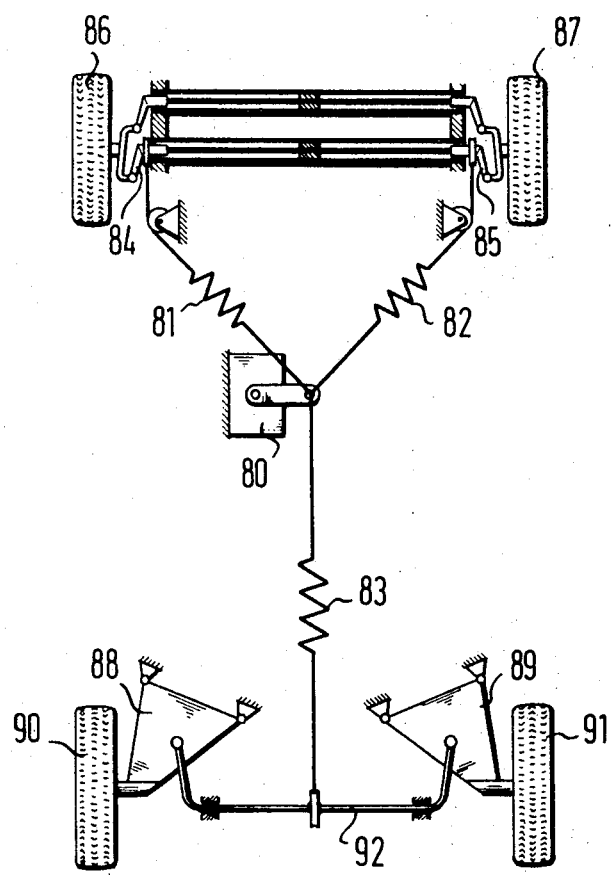
FIGS. 8 and 9 diagrammatically illustrate motor cars equipped with the devices of FIGS. 3 and 4 respectively.

FIG. 8 shows as much of a motorcar as is needed to illustrate an application of the sensing and control arrangement described above with reference to FIG. 3, the control box, its input shaft, and the sensing arm being jointly designated by the numeral 80. Tension springs 81, 82, 83 are attached to the free end of the sensing arm in the Y-pattern described with reference to FIG. 3. A first yieldably resilient device is constituted by the springs 81, 82 which diverge from the sensing arm toward the front wheels 86, 87. Flexible cables on the ends of the springs 81, 82 are trained over guide rollers on the chassis to suspension arms 84, 85 respectively secured to the stub axles of the front wheels 86, 87 in such a manner that the tension of the springs 81, 82 is changed by angular movement of the arms 84, 85 as the wheels 86, 87 move up and down relative to the chassis.

The third spring 83 constitutes a second yieldably resilient device interposed between the sensing arm of the control apparatus 80 and the stabilizer bar 92 which connects oblique suspension arms 88, 89 which hold the rear wheels 90, 91.

When the two front wheels 86, 87 move relative to the chassis in opposite directions by equal distances, the resulting increase in the tension in one of the springs 81, 82 is balanced by a corresponding relaxation of the other springs, and the condition of the control arrangement 80 remains unchanged. When the front wheels 86, 87 move in the same direction, the control arrangement 80 is actuated in a manner to restore the normal position of the chassis. Uniform movement of the chassis relative to the four wheels, or vice versa, does not affect the control mechanism 80. The change in the tension of the springs 81, 82 is balanced by the tension change in the opposing spring 83.

The apparatus illustrated in FIG. 8 is most useful in compensating longitudinal inclination of a vehicle having independently suspended, jointly controlled front wheels.

Figure 9:
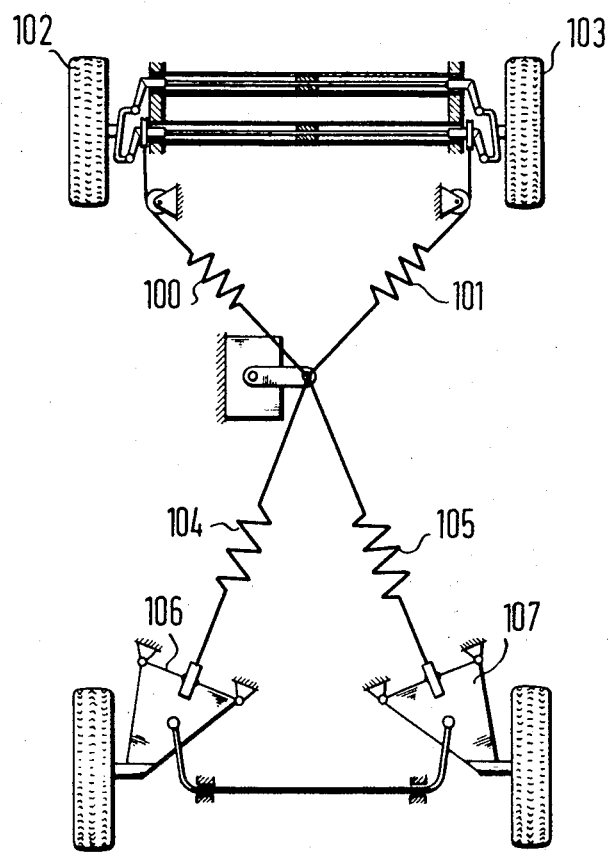

An application of the device seen in FIG. 4 is illustrated in FIG. 9 in a fragmentary plan view. The first yieldably resilient means is constituted by two helical tension springs 100, 101 which are connected with independently suspended front wheels 102, 103 in the manner described above with reference to FIG. 8.

The second yieldably resilient means which opposes the action of the springs 100, 101 on the control box of FIG. 4 consists of two helical tension springs 104, 105 connected with respective oblique control arms 106, 107 for the rear axle. Both front wheels are jointly controlled during their movement relative to the chassis when they move simultaneously relative to the chassis, the tension of the springs 104, 105 being applied to the chassis through the control arms 106, 107, and joint vertical displacement of the rear wheels is similarly corrected by comparison with a reference tension provided by the springs 100, 101 interposed between the sensing arm of the control arrangement and the chassis through the front wheel suspension.

If individual control boxes are provided for the four wheels or for the springs 100, 101, 104, 105 with corresponding opposing springs tying the sensing arms to the chassis, each wheel may be adjusted separately in a manner obvious from the description of FIGS. 1 to 9.

It is a common feature of the several sensing systems of the invention partly illustrated diagrammatically and partly shown by means of actual embodiments that the movement of a controlled wheel or of the associated axle is not directly transmitted to the sensing element by a motion transmitting train which may include a stroke-reducing device, but is first converted to a change in the tension of a spring which, in countering the effect of another spring, causes the sensing element to move. The last mentioned movement may be utilized in an entirely conventional manner to balance the original wheel or axle displacement.

While helical tension springs have been illustrated and referred to hereinabove, the invention is not limited to the specific yieldably resilient devices chosen for the purpose of the disclosure, and the stresses in these devices need not necessarily be tension stresses. Rubber springs and air springs are obviously interchangeable with the illustrated steel springs, and these springs may be stressed in compression or torsion rather than in tension if so desired. Cables, ropes, or other tension elements are eminently satisfactory for transmitting tensional stresses to tension springs, but other motion transmitting trains will readily be chosen to fit compression springs or torsion springs.

One of the resilient devices acting on the sensing element must be connected with the wheel or axle whose position relative to the chassis can be adjusted. The manner in which the other resilient device connects the sensing element to the chassis is capable of variations more numerous in an obvious manner than those enumerated and illustrated hereinabove, and the second resilient device may be used for introducing additional independent variables into the system to determine the ultimate equilibrium position of the sensing element between the resilient devices. A manually adjusted element on the chassis, such as a control lever accessible to the driver and referred to with reference to FIG. 2, is merely illustrative of a movable connection to the chassis.

It should be understood, therefore, that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What is claimed is:

1. In an apparatus for controlling the level of a vehicle chassis on an axle secured to said chassis, the apparatus including operating means for varying the spacing of said axle from said chassis, sensing means for sensing said spacing, and control means connected to said sensing means for controlling the operating means in response to a sensed change in said spacing and for thereby counteracting said change, the improvement which comprises:
   a. said sensing means including a sensing element movable and operatively connected to said control means for actuating the same by the movement of said sensing element;
   b. first yieldably resilient means connecting said sensing element to said axle and normally biasing said sensing element to move in a first direction; and
   c. second yieldably resilient means operatively interposed between said sensing element and said chassis and normally biasing said sensing element to move in a second direction opposite to said first direction.

2. In an apparatus as set forth in claim 1, said operating means including a pressure-fluid operated motor, and said control means including a valve in the pressure fluid supply of said motor and actuated by said sensing element.

3. In an apparatus as set forth in claim 1, said control means including a switch opened and closed by the movement of said sensing element, and said operating means including a motor controlled by said switch.

4. In an apparatus as set forth in claim 1, said control means including a control element having an input shaft movable about an axis thereof, said sensing element being mounted on said shaft for angular movement therewith about said axis.

5. In an apparatus as set forth in claim 1, said control means including a control element mounted on said chassis, said sensing element being secured to said control element, and said first and second yieldably resilient means including respective tension springs interposed between said axle and said chassis respectively and said sensing element.

6. In an apparatus as set forth in claim 5, a tension member of substantially fixed length connecting the tension spring of said first yieldably resilient means to said axle.

7. In an apparatus as set forth in claim 1, another axle movably mounted on said chassis, said second yieldably resilient means connecting said sensing element to said other axle with a tension varying with a movement of said other axle relative to said chassis.

8. In an apparatus as set forth in claim 7, a stabilizer bar secured to each of said axles for pivoting movement in response to movement of said axles relative to said chassis, a tensioning member fastened to each of said stabilizer bars for pivoting movement therewith, and motion transmitting means interposed between said tensioning members and said first and second yieldably resilient means for tensioning and relaxing the latter in response to the pivoting movement of the associated tensioning member.

9. In an apparatus as set forth in claim 1, means for varying the biasing face of said second yieldably resilient means.

10. In an apparatus as set forth in claim 1, each of said first and second yieldably resilient means including two tension springs secured to said sensing element, the springs of each yieldably resilient means jointly biasing said sensing element in a direction opposite to the joint biasing force of the tension springs in other yieldably resilient means, the biasing forces of the two tension springs in each yieldably resilient means being obliquely offset from each other, said sensing element being movable in each of said directions.

11. In an apparatus as set forth in claim 1, abutment means limiting the movement of said sensing element under the biasing force of said first and second yieldably resilient means.

12. In an apparatus as set forth in claim 1, said axle carrying two wheels independently sprung relative to said chassis, and said first yieldably resilient means including two tension springs respectively interposed between said wheels and said control element and means connecting each of said springs to said wheels respectively for changing the tension of the connected spring in response to movement of the associated wheel toward and away from said chassis independently of the corresponding movement of the other wheel.

* * * * *

UNITED STATES PATENT OFFICE
CERTIFICATE OF CORRECTION

Patent No. 3,709,517       Dated January 9, 1973

Inventor(s) FELIX WOSSNER

It is certified that error appears in the above-identified patent and that said Letters Patent are hereby corrected as shown below:

In the heading, line /73/: change "Fichrel" to -- Fichtel --

Signed and sealed this 22nd day of May 1973.

(SEAL)
Attest:

EDWARD M. FLETCHER, JR.
Attesting Officer

ROBERT GOTTSCHALK
Commissioner of Patents